United States Patent
Garrity et al.

(10) Patent No.: US 10,521,845 B2
(45) Date of Patent: Dec. 31, 2019

(54) SYSTEMS AND METHODS FOR NETWORK PRODUCT IDENTIFICATION AND SERVICE DELIVERY

(71) Applicant: Tagup, Inc., Somerville, MA (US)

(72) Inventors: Jonathan Tompkins Garrity, Somerville, MA (US); William Vega-Brown, Somerville, MA (US)

(73) Assignee: TAGUP, INC., Somerville, MA (US)

(*) Notice: Subject to any disclaimer, the term of this patent is extended or adjusted under 35 U.S.C. 154(b) by 328 days.

(21) Appl. No.: 15/400,740

(22) Filed: Jan. 6, 2017

(65) Prior Publication Data

US 2017/0200212 A1 Jul. 13, 2017

Related U.S. Application Data

(60) Provisional application No. 62/276,500, filed on Jan. 8, 2016.

(51) Int. Cl.
| | |
|---|---|
| *G06Q 30/00* | (2012.01) |
| *G06Q 30/06* | (2012.01) |
| *G06F 16/955* | (2019.01) |
| *G06F 16/9535* | (2019.01) |
| *G06Q 10/08* | (2012.01) |
| *H04L 29/06* | (2006.01) |

(52) U.S. Cl.
CPC ....... *G06Q 30/0623* (2013.01); *G06F 16/955* (2019.01); *G06F 16/9535* (2019.01); *G06Q 10/087* (2013.01); *G06Q 30/0601* (2013.01); *G06Q 30/0639* (2013.01); *H04L 63/08* (2013.01)

(58) Field of Classification Search
CPC ......... G06Q 10/08–0875; G06Q 30/06; G06Q 30/0601–0643; G06Q 30/08
See application file for complete search history.

(56) References Cited

U.S. PATENT DOCUMENTS

| | | | |
|---|---|---|---|
| 2003/0163724 A1* | 8/2003 | Tayebi ................... | G06Q 30/06 726/26 |
| 2008/0157927 A1* | 7/2008 | Soppera ................ | H04L 9/3263 340/10.1 |
| 2009/0055545 A1* | 2/2009 | Saba ...................... | G06Q 10/10 709/229 |
| 2012/0150602 A1* | 6/2012 | Bennett .............. | G06Q 30/0207 705/14.23 |
| 2013/0060813 A1* | 3/2013 | Eckberg ............. | G06Q 10/0833 707/783 |

(Continued)

OTHER PUBLICATIONS

Remote Real-Time Monitoring of Subsurface Landfill Gas Migration Fay, Cormac; Doherty, Aiden R; Beirne, Stephen; Collins, Fiachra; Foley, Colum; et al. Sensors11.7: 6603-6628. MDPI AG. (2011) (Year: 2011).*

*Primary Examiner* — William J Allen
(74) *Attorney, Agent, or Firm* — Wilmer Cutler Pickering Hale and Dorr LLP

(57) ABSTRACT

A product registration system that enables manufacturers to track products, log user interactions with the products, and provide services to those users interacting with products. This is handled by provisioning a Uniform Resource Identifier (URI), which is embedded on products a manufacturer would like to track and service. Interrogation of the URIs by users are logged and services provided over the network based on the manufacturer's needs.

16 Claims, 5 Drawing Sheets

(56) References Cited

U.S. PATENT DOCUMENTS

2015/0186541 A1* 7/2015 Vega ................. G06F 17/30887
                                                      705/26.8
2017/0148077 A1* 5/2017 Phillips .............. G06Q 30/0623

* cited by examiner

SYSTEMS AND METHODS FOR NETWORK PRODUCT IDENTIFICATION AND SERVICE DELIVERY

RELATED APPLICATIONS

This application claims priority to U.S. Provisional Patent Application No. 62/276,500, filed Jan. 8, 2016, which is hereby incorporated by reference herein in its entirety.

FIELD OF THE INVENTION

The invention relates to the field of product identification. More particularly, the invention relates to techniques for labeling products with web addresses for product identification and for delivery of product services.

BACKGROUND OF THE INVENTION

There are multiple methods of identifying manufactured goods. Many such goods are labelled with a Universal Product Code (UPC). A UPC contains a Manufacturer's identification number and an item number. This enables appropriately configured UPC readers to identify a given product's type and manufacturer, but no additional information directly. Following the adoption of UPC, a new standard was developed: the Electronic Product Code (EPC). The principle advantage of EPC over UPC is its capacity. An EPC, with maximum size of 256 bits, can uniquely identify several orders of magnitude more items than UPC. EPC codes are often embedded in Radio Frequency Identification (RFID) tags. An EPC typically encodes a product's serial number in addition to product type and manufacturer. This information, once captured by an appropriately configured reader, may be used to lookup the associated product's data in a product database.

Unfortunately, there are limitations with these methods. Principally:
1. There is no commonly accepted network to lookup EPC tag information. If a company scans a product's RFID tag with EPC data encoded on it, the data is useless unless the company has a record of the product's EPC.
2. Specialized hardware is required to scan EPC codes embedded on RFID tags. The general public cannot identify EPC codes with technologies they have everyday access to.

In addition to limitations with EPC-based product identification, there are associated limitations with users' information technology systems. Specifically:
1. Product data associated with an EPC code is stored in restricted-access networks. If a company wants to share certain product data with individuals or companies outside their network, they must implement idiosyncratic integrations or serve their data openly outside their network. The same is true in the reverse case (that is, users outside the network want to share data with the originating company).
2. There is no platform that links EPC or other identifying product codes across manufacturers, in order to deliver common services (for example, warranty claims) to users that interface with products from multiple manufacturers.

In summary, there is no known platform that can provision identifying product codes, manage product related data and services, and maintain user information and access rights.

SUMMARY OF THE DISCLOSURE

In one embodiment, techniques disclosed herein may be realized as a web-based platform for facilitating product identification and service delivery. The web-based platform may comprise one or more computer processors executing instructions. The one or more computer processors may be configured to store, in a database, data indicative of an identifier associated with a product unit and a set of data specific to the product unit. The set of data may comprise first data available to all users and second data only available to authorized users. The one or more computer processors may further be configured to receive a user request to access data associated with the product unit from a user. The request may comprise data indicative of the identifier. The one or more computer processors may further be configured to determine a level of authorization for the user. The level of authorization may indicate that the user is authorized to access only the first data associated with the product unit identified by the identifier. The one or more computer processors may be configured to transmit the first data to the user.

In accordance with other aspects of this embodiment, the second data specific to the product unit comprises a real-time operation status of the product unit, real-time operational data of the product unit, or both.

In accordance with other aspects of this embodiment, the one or more computer processors may further be configured to log user interactions with the product unit through the web-based platform.

In accordance with other aspects of this embodiment, the one or more computer processors may further be configured to receive a second user request to access data associated with the product unit from a second user. The second request may comprise data indicative of the identifier. The one or more computer processors may further be configured to determine a second level of authorization for the user. The level of authorization may indicate that the second user is authorized to access both the first data and the second data associated with the product unit identified by the identifier. The one or more computer processors may further be configured to transmit the first data and the second data to the user.

In accordance with other aspects of this embodiment, the one or more computer processors may further be configured to manage user credentials to access the first data, the second data, or both, associated with the product unit.

In accordance with other aspects of this embodiment, the identifier may be attached to the product unit in a Uniform Resource Identifier (URI).

In accordance with other aspects of this embodiment, the identifier may be embedded in at least one of a Near Field Communication chip or a Quick Response code.

In accordance with other aspects of this embodiment, the first data may not comprise any data, such that no data is available to public users.

In another embodiment, techniques disclosed herein may be realized as a method based on a web-based platform for facilitating product identification and service delivery. According to the method, data indicative of an identifier associated with a product unit and a set of data specific to the product unit may be stored in a database. The set of data may comprises first data available to all users and second data only available to authorized users. A user request to access data associated with the product unit from a user may be received. The request may comprise data indicative of the identifier. A level of authorization for the user may be determined. The level of authorization may indicate that the user is authorized to access only the first data associated with the product unit identified by the identifier. The first data to the user may be transmitted.

In still another embodiment, techniques disclosed herein may be realized as a non-transitory computer readable medium storing a computer-readable program for a web-based platform for facilitating product identification and service delivery. The program may include computer-readable instructions to store, in a database, data indicative of an identifier associated with a product unit and a set of data specific to the product unit. The set of data may comprise first data available to all users and second data only available to authorized users. The program may further include computer-readable instructions to receive a user request to access data associated with the product unit from a user. The request may comprise data indicative of the identifier. The program may further include computer-readable instructions to determine a level of authorization for the user. The level of authorization may indicate that the user is authorized to access only the first data associated with the product unit identified by the identifier. The program may further include computer-readable instructions to transmit the first data to the user.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
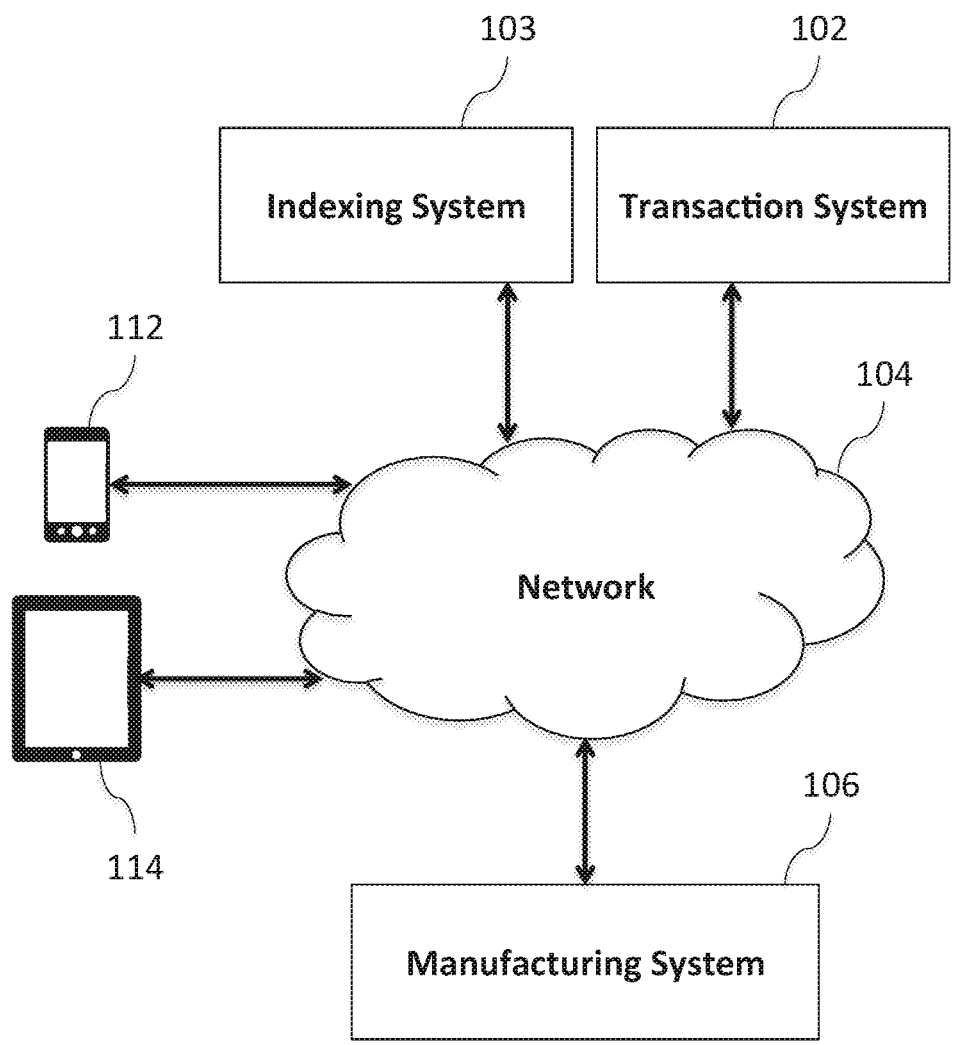
FIG. 1 is an overview of the system described, including the transaction and indexing systems.

One embodiment of the system is illustrated in FIG. 1. The Transaction System [102] and the Indexing System [103] are described in detail in FIG. 2 and FIG. 3, respectively. Both are software programs. In the preferred embodiment, they are deployed as web applications. However, they may also be deployed on a local network. In the preferred embodiment, the Network [104] is the Internet, but can be any network, public or private.

The Manufacturing System [106] is connected to the Network [104]. This is required for communication between Manufacturing System [106] and the Indexing System [103]. It is managed by the manufacturer of the materials to be identified via the system.

Client Device 1 [112] and Client Device 2 [114] are devices used to access and exchange data with the system via the Network [104]. In this embodiment, Client Device 1 [112] is used by an employee of the manufacturer and Client Device 2 [114] is used by the tagged product's end user. In other examples, Client Device 1 [112] and Client Device 2 [114] could be used by resellers, logistics providers, members of the public, distributors, retailers, service engineers, or other individuals who might interface with the tagged product.

Figure 2:
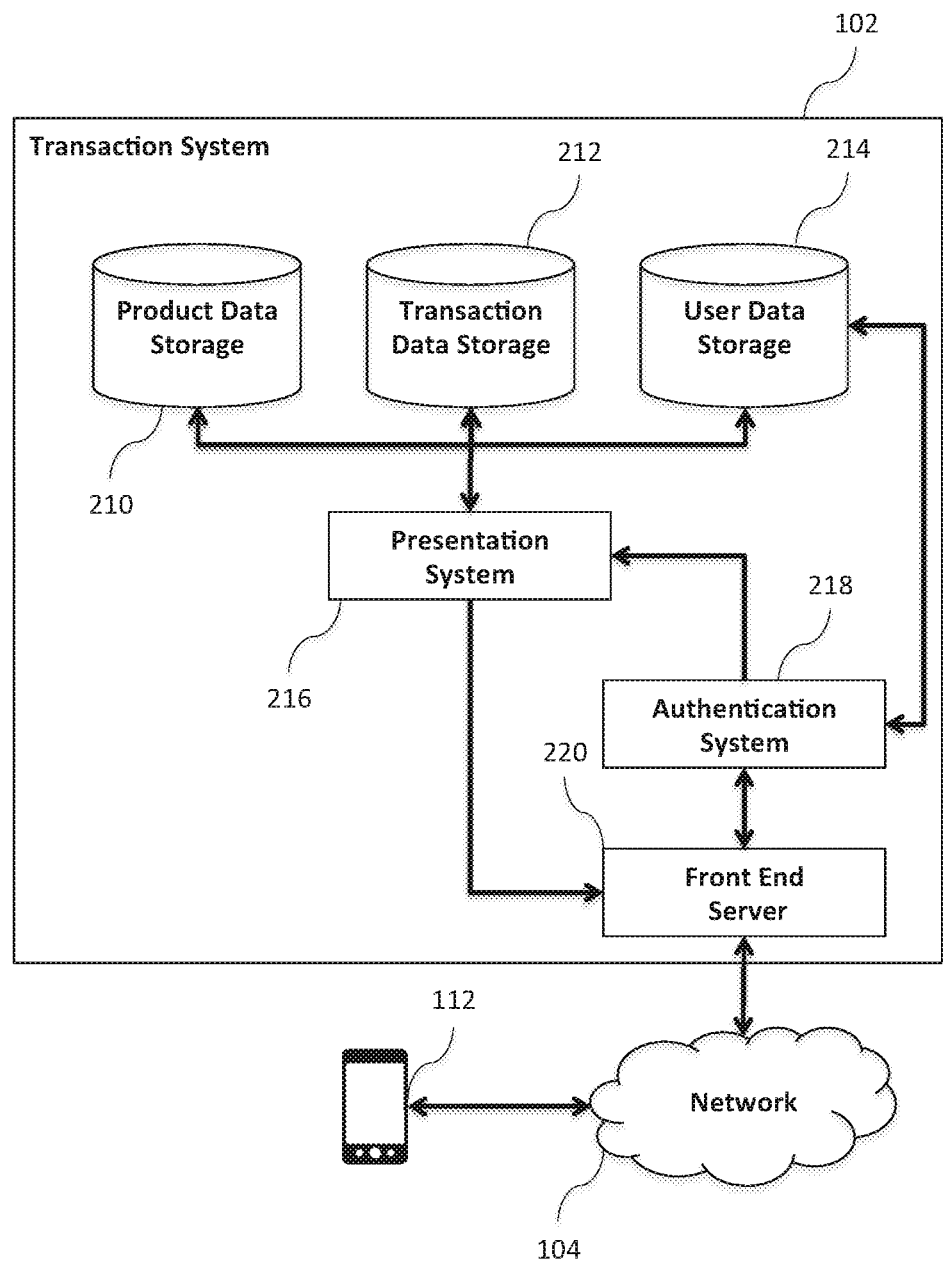
FIG. 2 is a detailed view of the transaction system.

Much of the product, user, and transactional data is handled by the Transaction System [102] detailed in FIG. 2. Client Device 1 [112] or any other client device interfaces with Transaction System [102] through the Network [104]. Data is exposed to the client via the Front End Server [220], which is in turn sent data from the Presentation System [216]. The Presentation System [216] receives data from, and pushes client submitted data to three principal databases. These are the Product Data Storage [210], the Transaction Data Storage [212], and the User Data Storage [214]. User Data Storage [214] is also connected to the Authentication System [218] to provide user permissions and verify user credentials.

Figure 3:
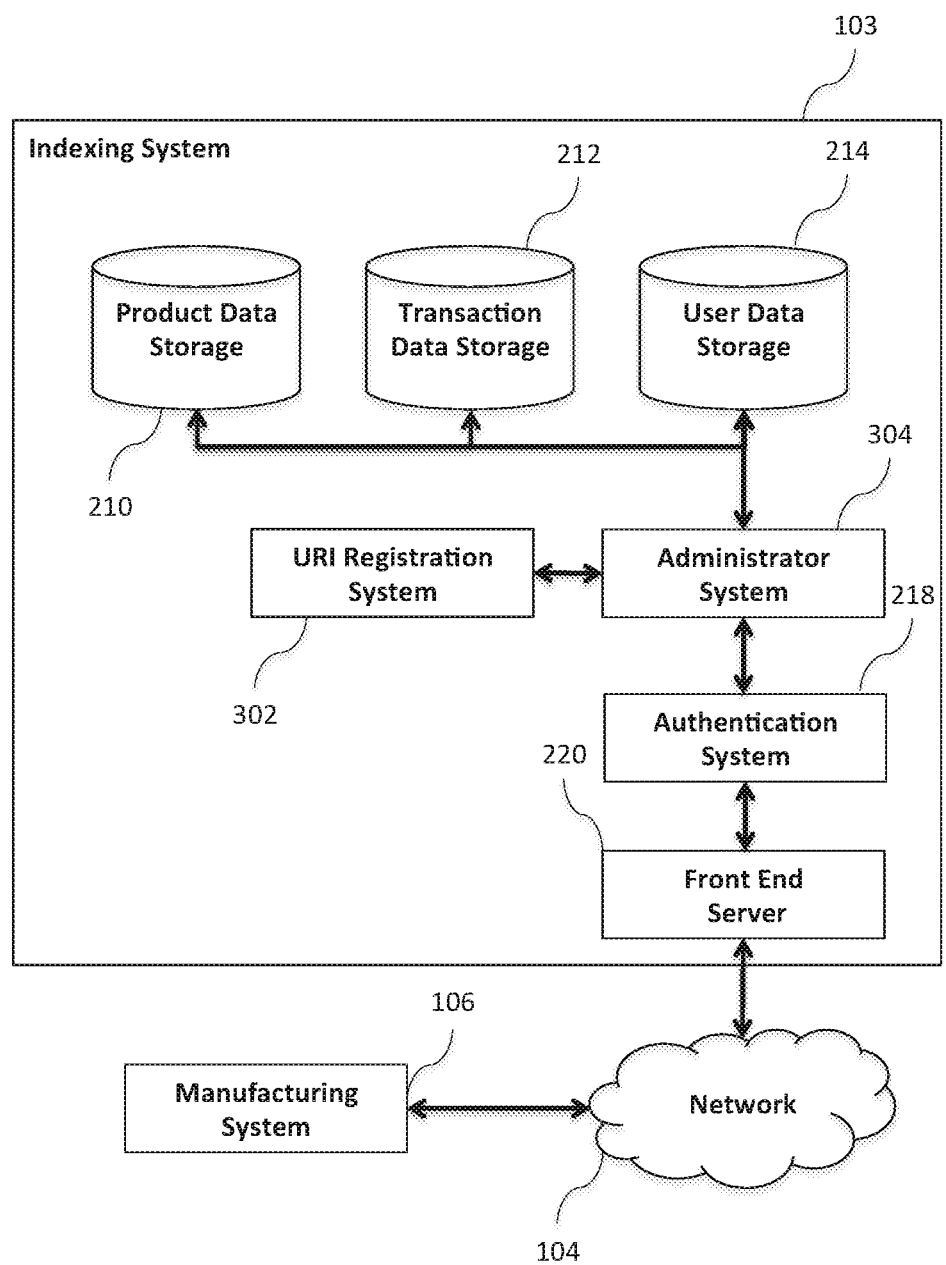
FIG. 3 is a detailed view of the indexing system.

The principal application of Indexing System [103], detailed in FIG. 3, is to provision one or more Uniform Resource Identifiers (URIs) to the Manufacturing System [106]. It is connected to and interfaces with the Manufacturing System [106] through the Network [104]. It has access to many of the same resources available to the Transaction System [102]. Specifically, components of Product Data Storage [210], Transaction Data Storage [212], User Data Storage [214], the Authentication System [218], and the Front End Server [220] are shared. The Administrator System [304] is the principal system for the Manufacturing System [106] to request URIs from the URI Registration System [302]. It also is connected to the three data storage systems, enabling the manufacturer to access and update product-related data, transaction data and user data. It is connected to the Authentication System [218] to ensure data accessed and exchanged is between authorized parties only. Data is served back to the client via the Front End Server [220].

Figure 5:
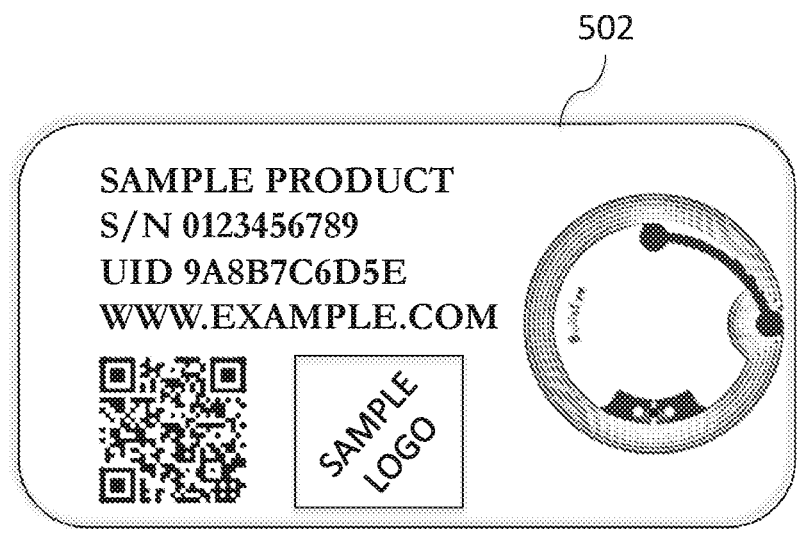
FIG. 5 is an example tag appended to the manufacturer's product.

To associate a URI with a product, the URI must be embedded, etched, attached, or otherwise associated with a manufactured good. One way to do this is with an adhesive sticker. An example is shown in FIG. 5. Here, the Tag [502] is a example means of associating the URI with a product. The tag would be appended by the manufacturer, retailer, service shop, or any other user who would interface with the product. The URI is embedded in this example using a Near Field Communication (NFC) chip and a Quick Response (QR) code, but any auto-identification technology capable of embedding a URI may be used. The URI could also be represented visually. The Tag [502] might also include data about the product, manufacturer, or other identifying information.

There are two distinct interactions with this system. The first is that of the manufacturer requesting one or more URIs for appending on one or more products. The second is the interaction between a client and the Transaction System [102], which occurs following interrogation of the URI by Client Device 1 [112].

First, when a manufacturer would like to track a given product, their Manufacturing System [106] accesses the Indexing System [103] over the Network [104]. The Authentication System [218] validates the permissions and identify of the manufacturer. The manufacturer then has access to the Administrator System [304]. Here they can request one or more URIs via the URI Registration System [302]. The assignment of URIs to manufacturers and to specific products are indexed in the URI Registration System [302]. Data in Product Data Storage [210], Transaction Data Storage [212], and User Data Storage [214] are all mapped to this index.

The Administrator System [304] also allows the manufacturer to upload product data, user permissions, user data and other data types to the appropriate data stores within the Indexing System [103]. Manufacturer activity within the Indexing System [103] is logged in Transaction Data Storage [212]. For example, URI generation requests, updating user permissions, managing product data, and any other activity that might be relevant for application management could be logged. Using the Front End Server [220] or accessing the data stores via an Application Programming Interface (API), the manufacturer may download data related to interactions with their provisioned URIs and associated products. For example, the manufacturer could see which users had interrogated which product URIs, at what time, the nature of the interaction, and data from the Client Device 1 [112] such as location information, Internet Protocol (IP) address, media access control (MAC) addresses, and any other data that might be captured from the client device. The manufacturer and other authorized users may also view product sensor data that is sent to the Transaction System [102]. Sensor data, including streaming sensor data, can be linked directly to the application via TCP/IP or related protocols. Example sensors include GPS, accelerometer, pressure, temperature, and conductivity, but the application may include any sensor type. This sensor data may be sent to the application and made available to users in real-time or close to real-time.

Figure 4:
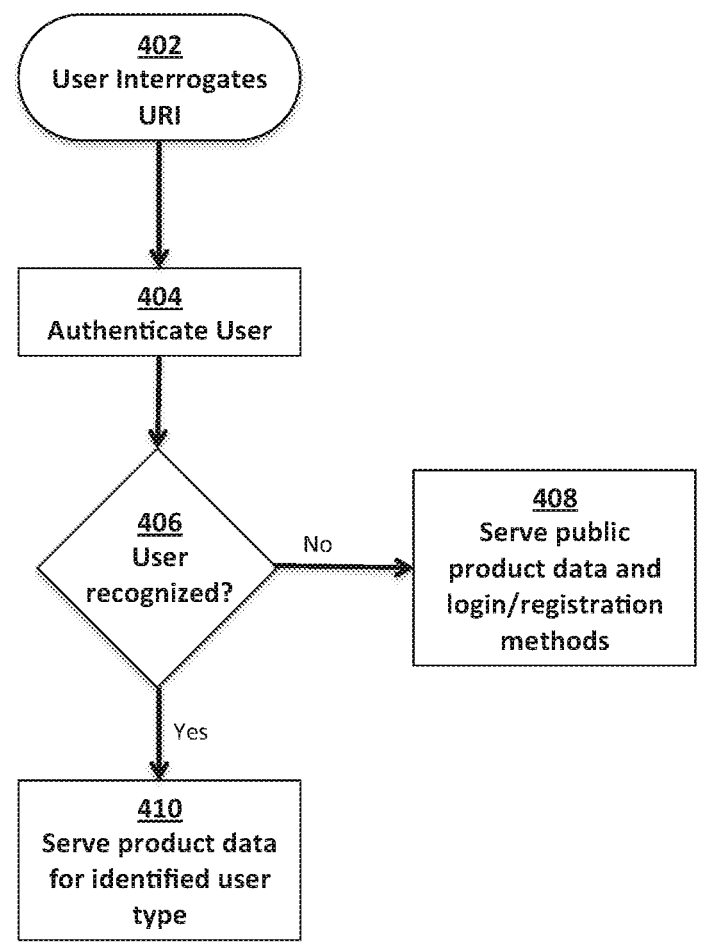
FIG. 4 is an example user interaction with the system.

The second interaction is between a client interfacing with the URI (embedded on the manufacturer's product via a Tag [502]) and the Transaction System [102]. An example interaction is depicted in FIG. 4. Here a user in [402] interrogates the URI specific to the product the individual is interfacing with using Client Device 1 [112]. The client is served with the appropriate product data via the Front End Server [220]. The Authentication System [218] will then authenticate the user [404]. If the user's credentials are recognized [406], then the Presentation System [216] will serve the product data to be served to the identified user type [410]. If the user's credentials are not recognized, then the Presentation System [216] will pass publicly accessible product data and login or registration methods to the user [408] via Front End Server [220].

The invention claimed is:

1. A web-based platform comprising:
one or more computer processors executing instructions that cause the one or more computer processors to:
link, via a network, to at least one sensor of a product unit;
receive, from the at least one sensor of the product unit, second data specific to the product unit, the second data comprising sensor data of the at least one sensor;
store, in a database in communication with the one or more computer processors, data comprising:
a uniform resource identifier (URI) assigned to the product unit; and
a set of data associated with the product unit, wherein the set of data comprises:
first data available to all users; and the second data specific to the product unit, the second data being available only to authorized users;
receive, responsive to an interrogation of the URI with a client device, a user request to access data associated with the product unit, wherein the request comprises a set of user credentials;
in response to the received request, authenticate the user based on the set of user credentials;
in response to the user credentials being recognized, transmit the second data to the client device;
in response to the user credentials not being recognized, transmit the first data accessible to all users and one or more login methods to the client device of the user; and
log, with respect to the user request to access data associated with the product unit, data captured from the client device.

2. The web-based platform according to claim 1, wherein the second data comprises a real-time operation status of the product unit, real-time operational data of the product unit, or both.

3. The web-based platform according to claim 1, wherein the instructions further cause the one or more computer processors to:
receive a second user request to access data associated with the product unit from a second client device associated with a second user, wherein the second request comprises a second set of user credentials;
authenticate the second user based on the second set of user credentials; and
in response to determining, based on the authentication of the second user, that the second user is not an authorized user, transmit the first data to the second client device.

4. The web-based platform according to claim 1, wherein the identifier is attached to the product unit in a Uniform Resource Identifier (URI).

5. The web-based platform according to claim 1, wherein the identifier is embedded in at least one of a Near Field Communication chip or a Quick Response code.

6. The web-based platform according to claim 1, wherein at least one of the one or more sensors is selected from a group consisting of a GPS sensor, an accelerometer, a pressure sensor, a temperature sensor, and a conductivity sensor.

7. A method comprising:
linking, via a network, one or more processors to at least one sensor of a product unit;
receiving, from the at least one sensor of the product unit, second data specific to the product unit, the second data comprising sensor data of the at least one sensor;
storing, in a database, data comprising:
a uniform resource identifier (URI) assigned to the product unit; and
a set of data associated with the product unit, wherein the set of data comprises:
first data available to all users; and
the second data specific to the product unit, the second data being available to authorized users;
receiving, responsive to an interrogation of the URI with a client device, a user request to access data associated with the product unit, wherein the request comprises a set of user credentials;
in response to the received request, authenticating the user based on recognizing the set of user credentials;

in response to the user credentials being recognized, causing, by the one or more processors, the second data to be transmitted to the client device;

in response to the user credentials not being recognized, causing, by the one or more processors, the first data accessible to all users and one or more login methods to be transmitted to the client device of the user; and logging, by the one or more processors with respect to the user request to access data associated with the product unit, data captured from the client device.

8. The method according to claim 7, wherein the second data comprises a real-time operation status of the product unit, real-time operational data of the product unit, or both.

9. The method according to claim 7, further comprising:
receiving a second user request to access data associated with the product unit from a second client device associated with a second user, wherein the second request comprises a second set of user credentials;

determining that the second set of user credentials is not recognized; and transmitting the first data to the second client device in response to determining that the second set of user credentials is not recognized.

10. The method according to claim 7, wherein the identifier is attached to the product unit in a Uniform Resource Identifier (URI).

11. The method according to claim 7, wherein the identifier is embedded in at least one of a Near Field Communication chip or a Quick Response code.

12. A non-transitory computer readable medium storing a computer-readable program for a web-based platform, the computer-readable program comprising one or more sets of computer-readable instructions configured to:

link, via a network, to at least one sensor of a product unit using a TCP/IP protocol;

receive, from the at least one sensor of the product unit, second data specific to the product unit, the second data comprising sensor data of the at least one sensor; comprising:

a uniform resource identifier (URI) assigned to the product unit; and a set of data associated with the product unit, wherein the set of data comprises:

first data available to users having unrecognized user credentials; and the second data specific to the product unit, the second data available only to authorized users;

receive, responsive to an interrogation of the URI with a client device, a user request to access data associated with the product unit, wherein the request comprises user credentials associated with the user;

responsive to the received request, determine that the user credentials associated with the user comprise recognized user credentials;

transmit the second data to the client device in response to determining that the user credentials associated with the user comprise recognized user credentials;

transmit the first data accessible to all users and one or more login methods to the client device of the user in response to determining that the user credentials associated with the user comprise unrecognized credentials; and log, with respect to the user request to access data associated with the product unit, data captured from the client device.

13. The non-transitory computer readable medium according to claim 12, wherein the second data comprises a real-time operation status of the product unit, real-time operational data of the product unit, or both.

14. The non-transitory computer readable medium according to claim 12, wherein the computer-readable program further comprises:

computer-readable instructions to receive a second user request to access data associated with the product unit from a second client device associated with a second user, wherein the second request comprises second user credentials associated with the second user;

computer-readable instructions to determine that the second user credentials associated with the second user comprise unrecognized user credentials; and computer-readable instructions to transmit the first data to the second client device in response to determining that the second user credentials associated with the second user comprise unrecognized user credentials.

15. The non-transitory computer readable medium according to claim 12, wherein the identifier is attached to the product unit in a Uniform Resource Identifier (URI).

16. The web-based platform according to claim 1, wherein the direct link is established via TCP/IP protocol.

* * * * *